US010937447B2

(12) United States Patent
Mamori et al.

(10) Patent No.: US 10,937,447 B2
(45) Date of Patent: Mar. 2, 2021

(54) HARMONY GENERATION DEVICE AND STORAGE MEDIUM

(71) Applicant: Roland Corporation, Shizuoka (JP)

(72) Inventors: Hideyuki Mamori, Shizuoka (JP);
Masayuki Nakayama, Shizuoka (JP);
Hideaki Shiraishi, Shizuoka (JP)

(73) Assignee: Roland Corporation, Shizuoka (JP)

(*) Notice: Subject to any disclaimer, the term of this patent is extended or adjusted under 35 U.S.C. 154(b) by 0 days.

(21) Appl. No.: 16/550,294

(22) Filed: Aug. 26, 2019

(65) Prior Publication Data
US 2020/0105294 A1  Apr. 2, 2020

(30) Foreign Application Priority Data

Aug. 28, 2018 (JP) ................. 2018-158824

(51) Int. Cl.
| | |
|---|---|
| *G10L 25/81* | (2013.01) |
| *G10L 21/013* | (2013.01) |
| *G10L 15/28* | (2013.01) |
| *G10L 25/90* | (2013.01) |
| *G10H 1/38* | (2006.01) |

(52) U.S. Cl.
CPC ............ *G10L 25/81* (2013.01); *G10H 1/383* (2013.01); *G10L 15/285* (2013.01); *G10L 21/013* (2013.01); *G10L 25/90* (2013.01); *G10H 2210/091* (2013.01); *G10H 2210/335* (2013.01); *G10L 2025/906* (2013.01)

(58) Field of Classification Search
CPC ..... G10L 25/81; G10L 21/013; G10L 15/285; G10L 25/90; G10L 2025/906; G10H 1/383; G10H 2210/335

USPC .......................................................... 84/612
See application file for complete search history.

(56) References Cited

U.S. PATENT DOCUMENTS

| | | | | |
|---|---|---|---|---|
| 5,231,671 A | * | 7/1993 | Gibson .................... | G10G 7/02 704/205 |
| 5,712,437 A | * | 1/1998 | Kageyama ............. | G10H 1/366 84/610 |
| 5,739,452 A | * | 4/1998 | Nagata ................... | G10H 1/366 84/610 |
| 5,973,252 A | * | 10/1999 | Hildebrand ............. | G10H 1/02 84/603 |

(Continued)

FOREIGN PATENT DOCUMENTS

JP  H08234784  9/1996

*Primary Examiner* — David S Warren
*Assistant Examiner* — Christina M Schreiber
(74) *Attorney, Agent, or Firm* — JCIPRNET

(57) ABSTRACT

A harmony generation device and a program for the same which can generate a natural harmony sound are provided. The harmony generation device (1) generates first and second harmony tones to which a voice input through a microphone (M) is shifted in pitch by first and second shift amounts calculated based on both the voice input through the microphone (M) and a chord determined from performance information of an electric guitar (G) input through an input device (34). That is, since the first and second harmony tones can be tones based on the chord of the electric guitar (G) that changes from moment to moment, the harmony sound obtained by mixing the first and second harmony tones with the voice input through the microphone (M) can be a natural harmony sound that is rich in variation according to the chord of the electric guitar (G).

20 Claims, 8 Drawing Sheets

(56) References Cited

U.S. PATENT DOCUMENTS

| | | | | |
|---|---|---|---|---|
| 6,023,017 | A | * | 2/2000 | Minowa .................. G10H 1/386 84/637 |
| 6,046,395 | A | * | 4/2000 | Gibson .................... G10H 1/20 84/603 |
| 6,121,531 | A | * | 9/2000 | Kato ....................... G10H 1/366 434/307 A |
| RE37,041 | E | * | 2/2001 | Koyama .............. G10H 1/0066 84/669 |
| 2001/0037196 | A1 | * | 11/2001 | Iwamoto ................ G10H 1/366 704/207 |
| 2011/0251840 | A1 | * | 10/2011 | Cook .................. G10L 13/0335 704/207 |
| 2014/0174280 | A1 | * | 6/2014 | Nishigori ................ G10H 1/38 84/622 |
| 2014/0180683 | A1 | * | 6/2014 | Lupini ................... G10H 1/383 704/208 |
| 2020/0105294 | A1 | * | 4/2020 | Mamori ................. G10H 1/383 |

\* cited by examiner

Scale table 31b

| Note \ Scale | C | C# | D | D# | E | F | F# | G | G# | A | A# | B |
|---|---|---|---|---|---|---|---|---|---|---|---|---|
| Si | ○ | × | ○ | × | ○ | × | ○ | ○ | × | ○ | × | ○ |
| #la | × | ○ | × | ○ | × | ○ | ○ | × | ○ | × | ○ | ○ |
| La | ○ | × | ○ | × | ○ | ○ | × | ○ | × | ○ | ○ | × |
| #sol | × | ○ | × | ○ | ○ | × | ○ | × | ○ | ○ | × | ○ |
| Sol | ○ | × | ○ | ○ | × | ○ | × | ○ | ○ | × | ○ | × |
| #fa | × | ○ | ○ | × | ○ | × | ○ | ○ | × | ○ | × | ○ |
| Fa | ○ | ○ | × | ○ | × | ○ | ○ | × | ○ | × | ○ | × |
| Mi | ○ | × | ○ | × | ○ | ○ | × | ○ | × | ○ | × | ○ |
| #re | × | ○ | × | ○ | ○ | × | ○ | × | ○ | × | ○ | × |
| Re | ○ | × | ○ | ○ | × | ○ | × | ○ | × | ○ | ○ | × |
| #do | × | ○ | ○ | × | ○ | × | ○ | × | ○ | ○ | × | ○ |
| Do | ○ | ○ | × | ○ | × | ○ | × | ○ | ○ | × | ○ | × |

FIG. 3(a)

Chord table 31c

| Chord type | Major | | | | | | | Minor | | | | | |
|---|---|---|---|---|---|---|---|---|---|---|---|---|---|
| Note \ Chord | C | C7 | CM7 | Caug | D | D7 | : | Cm | Cm7 | Cdim | Cm7♭5 | Dm | : |
| Si | × | × | ○ | × | × | × | : | × | × | × | × | × | : |
| #la | × | ○ | × | × | × | × | : | × | ○ | × | ○ | × | : |
| La | × | × | × | × | ○ | ○ | : | × | × | × | × | ○ | : |
| #sol | × | × | × | ○ | × | × | : | × | × | × | × | × | : |
| Sol | ○ | ○ | ○ | × | × | × | : | ○ | ○ | × | × | × | : |
| #fa | × | × | × | × | ○ | ○ | : | × | × | ○ | ○ | × | : |
| Fa | × | × | × | × | × | × | : | × | × | × | × | ○ | : |
| Mi | ○ | ○ | ○ | ○ | × | × | : | × | × | × | × | × | : |
| #re | × | × | × | × | × | × | : | ○ | ○ | ○ | ○ | × | : |
| Re | × | × | × | × | ○ | ○ | : | × | × | × | × | ○ | : |
| #do | × | × | × | × | × | × | : | × | × | × | × | × | : |
| Do | ○ | ○ | ○ | ○ | × | ○ | : | ○ | ○ | ○ | ○ | × | : |

FIG. 3(b)

HARMONY GENERATION DEVICE AND STORAGE MEDIUM

CROSS REFERENCE TO RELATED APPLICATIONS

This application claims the priority benefit of Japanese Patent Application No. 2018-158824, filed on Aug. 27, 2018. The entirety of the above-mentioned patent application is hereby incorporated by reference herein and made a part of this specification.

BACKGROUND

Technical Field

The disclosure relates to a harmony generation device and a storage medium.

Description of Related Art

Patent Document 1 discloses a harmony generation device used for a karaoke device. The harmony generation device receives a vocal tone of a singer and shifts the pitch of the vocal tone a third or fifth degree higher in accordance with the key and scale of a piece of music being played. The pitch-shifted harmony tone and the vocal tone are synthesized and output to realize a harmonious harmony.

PATENT DOCUMENTS

[Patent Document 1] Japanese Laid-Open No. H08-234784

However, the harmony tone generated by the harmony generation device is always a third or fifth degree above the vocal tone and thus the pitch difference between the vocal tone and the harmony tone is always fixed and the harmony is mechanical and unnatural.

SUMMARY

The embodiments of the disclosure provide a harmony generation device and a program for the same which can generate a natural harmony sound.

According to an embodiment, a harmony generation device includes a voice input portion configured to input a voice, a performance input portion configured to input performance information of a musical instrument, a chord determination portion configured to determine a chord of the performance information input through the performance input portion, a pitch shift portion configured to shift a pitch of the voice input through the voice input portion on the basis of the chord determined by the chord determination portion, and an output portion configured to output a pitch tone obtained by the shifting of the pitch shift portion and the voice input through the voice input portion. The output portion may be configured to output the voice input through the voice input portion after separately performing an effect process such as reverb or pitch shift on the voice input through the voice input portion.

According to an embodiment, a harmony generation device includes a voice input portion configured to input a voice, a performance input portion configured to input performance information of a musical instrument, a chord determination portion configured to determine a chord of the performance information input through the performance input portion, a pitch shift portion configured to shift a pitch of the voice input through the voice input portion on the basis of the chord determined by the chord determination portion, and an output portion configured to output a pitch tone obtained by the shifting of the pitch shift portion and the voice input through the voice input portion. The pitch shift portion is configured to generate a first harmony tone and a second harmony tone that differ in pitch, mix the first and second harmony tones with the voice input through the voice input portion, and output the mixture as a harmony sound to the output portion.

According to an embodiment, a storage medium stores a program for causing a computer to generate harmony according to an input voice, the program including a voice input step of inputting a voice of a user, a performance input step of inputting performance information of a musical instrument, a chord determination step of determining a chord of the performance information input by the performance input step, a pitch shift step of shifting a pitch of the voice input by the voice input step on the basis of the chord determined by the chord determination step, and an output step of outputting a pitch tone obtained by the shifting of the pitch shift step and the voice input by the voice input step, such that the program generates harmony according to the input voice. The output step may include outputting the voice input by the voice input step after separately performing an effect step such as reverb or pitch shift on the voice input by the voice input step.

BRIEF DESCRIPTION OF THE DRAWINGS

FIG. 3(a) is a view schematically showing a scale table and FIG. 3(b) is a view schematically showing a chord table.

DESCRIPTION OF THE EMBODIMENTS

Hereinafter, exemplary embodiments will be described with reference to the accompanying drawings. A harmony generation device 1 according to the present embodiment is a device that generates a first harmony tone and a second harmony tone (hereinafter referred to as "first and second harmony tones"), which are pitch tones obtained by shifting an input voice on the basis of the input voice and a chord being played on a musical instrument, and mixes the first and second harmony tones with the input voice and outputs the mixture as a harmony sound. First, the functions of the harmony generation device 1 will be described with reference to FIG. 1.

Figure 1:
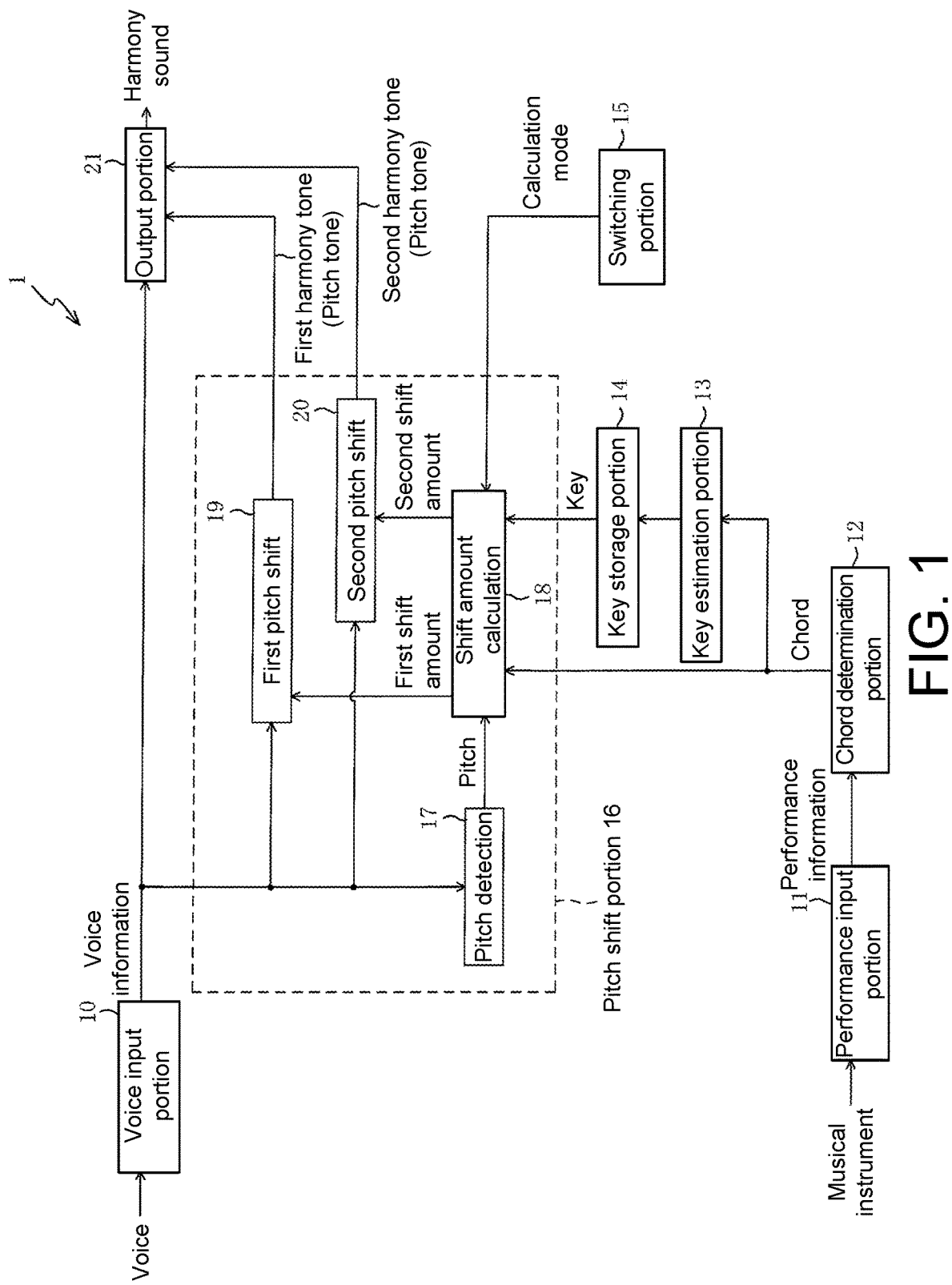
FIG. 1 is a functional block diagram of a harmony generation device according to an embodiment.

FIG. 1 is a functional block diagram of the harmony generation device 1 according to an embodiment. As shown in FIG. 1, the harmony generation device 1 includes a voice input portion 10 for inputting a voice, a performance input portion 11 for inputting performance information based on a live performance on the musical instrument such as an electric guitar or an electronic piano (that is, a performance on the musical instrument by a player at that time), a chord determination portion 12, a key estimation portion 13, a key storage portion 14, a switching portion 15, a pitch shift portion 16, and an output portion 21.

The chord determination portion 12 is a function of determining a chord on the basis of the performance information from the performance input portion 11, and is realized by a CPU 30 which will be described later with reference to FIG. 2. The key estimation portion 13 is a function of estimating a key (tonic note) of the scale (scale of degrees) of the piece of music being played on the basis of the chord determined by the chord determination portion 12, and is realized by the CPU 30. The key storage portion 14 is a function of storing the key estimated by the key estimation portion 13, and is realized by an estimated key memory 32c which will be described later with reference to FIG. 2. The switching portion 15 is a function of switching between generation of first and second harmony tones on the basis of the key stored in the key storage portion 14 with priority over the chord determined by the chord determination portion 12 and generation of first and second harmony tones on the basis of the chord determined by the chord determination portion 12 with priority over the key stored in the key storage portion 14, and is realized by a setting button 33 in FIG. 2.

Figure 2:
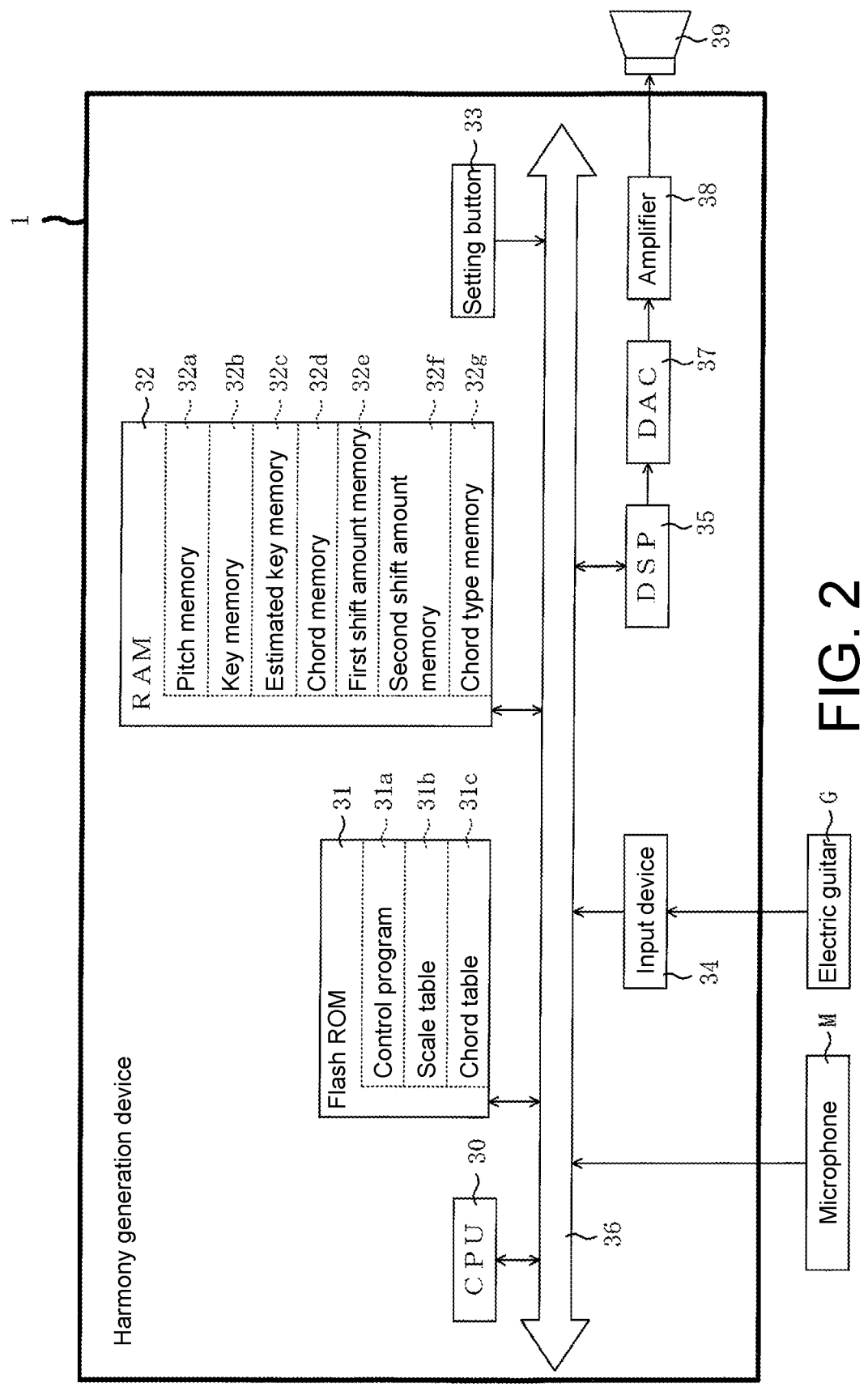
FIG. 2 is a block diagram showing an electrical configuration of the harmony generation device.

The pitch shift portion 16 is a function of generating first and second harmony tones, which are pitch tones obtained by shifting the pitch of a voice input through the voice input portion 10, on the basis of the voice input through the voice input portion 10, the chord determined by the chord determination portion 12, the key stored in the key storage portion 14, and a calculation mode from the switching portion 15, and is realized by the CPU 30 and a DSP 35 (see FIG. 2). The pitch shift portion 16 further includes a pitch detection 17, a shift amount calculation 18, a first pitch shift 19, and a second pitch shift 20.

The pitch detection 17 is a function of detecting the pitch of the voice input through the voice input portion 10 and the shift amount calculation 18 is a function of calculating a first shift amount and a second shift amount (hereinafter referred to as "first and second shift amounts"), which are the amounts of shift for generating the first and second harmony tones, on the basis of the pitch from the pitch detection 17, the chord determined by the chord determination portion 12, the key stored in the key storage portion 14, and the calculation mode from the switching portion 15. The first pitch shift 19 is a function of generating a first harmony tone by shifting the pitch of the voice input through the voice input portion 10 on the basis of the first shift amount and the second pitch shift 20 is a function of generating a second harmony tone by shifting the pitch of the voice input through the voice input portion 10 on the basis of the second shift amount.

First, the pitch shift portion 16 calculates, by the shift amount calculation 18, first and second shift amounts based on the pitch from the pitch detection 17, the chord determined by the chord determination portion 12, and the key stored in the key storage portion 14. Then, the pitch shift portion 16 generates, by the first and second pitch shifts 19 and 20, first and second harmony tones from the voice input through the voice input portion 10 on the basis of the first and second shift amounts.

The output portion 21 is a function of outputting a harmony sound obtained by mixing the voice input through the voice input portion 10 with the first and second harmony tones from the pitch shift portion 16, and is realized by the CPU 30 and the DSP 35.

As can be seen from the above, the harmony generation device 1 generates, by the pitch shift portion 16, first and second harmony tones on the basis of the voice input through the voice input portion 10, the chord determined by the chord determination portion 12, the key stored in the key storage portion 14, and the calculation mode from the switching portion 15. Here, since the chord changes from moment to moment depending on the live performance on the musical instrument, the harmony generation device 1 cannot read the chord played on the musical instrument in advance. Therefore, the chord determination portion 12 determines the chord on the basis of performance information of the musical instrument input through the performance input portion 11, and first and second harmony tones are generated on the basis of the determined chord. Thus, the first and second harmony tones change from moment to moment on the basis of the chord that changes from moment to moment, and therefore a harmony sound which the first and second harmony tones and the voice input through the voice input portion 10 are mixed and output as can be a natural harmony sound that is not mechanical and is rich in variation.

Further, generation of first and second harmony tones on the basis of the key stored in the key storage portion 14 with priority over the chord determined by the chord determination portion 12 and generation of first and second harmony tones on the basis of the chord determined by the chord determination portion 12 with priority over the key stored in the key storage portion 14 are switched between according to the calculation mode from the switching portion 15. Thus, it is possible to output a harmony sound that matches the tune or the like of a piece of music being played on the musical instrument. In addition, by appropriately changing the calculation mode according to the progress of the piece of music being played (such as modulation or the musical instrument not being played), it is possible to output a harmony sound that is rich in expression and flexible with respect to the progress of the piece of music.

Next, an electrical configuration of the harmony generation device 1 will be described with reference to FIG. 2, FIG. 3(a) and FIG. 3(b). FIG. 2 is a block diagram showing the electrical configuration of the harmony generation device 1. The harmony generation device 1 includes the CPU 30, a flash ROM 31, a RAM 32, the setting button 33 (an example of the switching portion 15 in FIG. 1), which is an operator for setting various settings of the harmony generation device 1, a microphone M for inputting a voice, an input device 34, and the digital signal processor 35 (hereinafter referred to as a "DSP 35") that are connected via a bus line 36. Further, a digital analog converter (DAC) 37 is connected to the DSP 35, an amplifier 38 is connected to the DAC 37, and a speaker 39 is connected to the amplifier 38.

Figure 4:
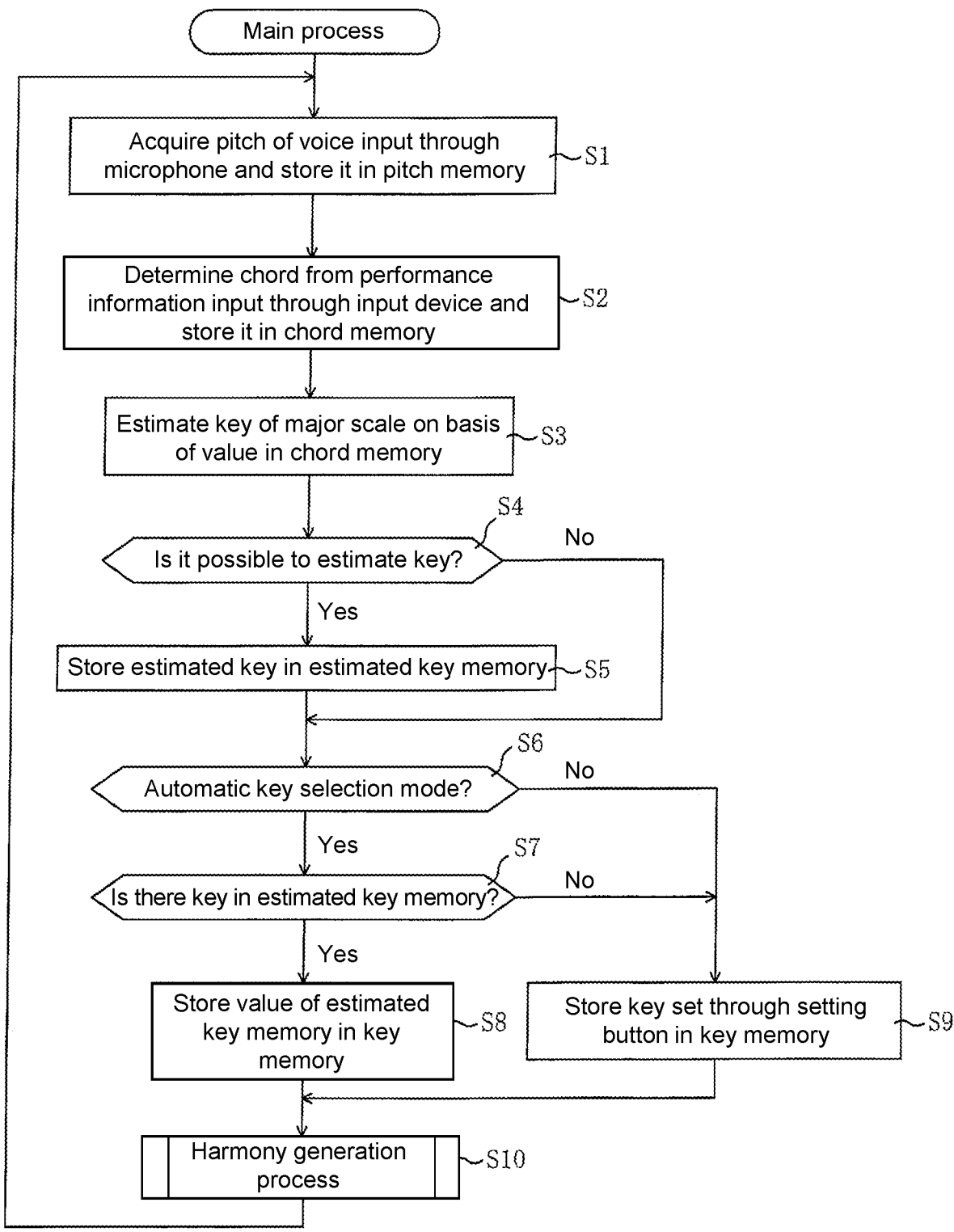
FIG. 4 is a flowchart of a main process.

The CPU 30 is a calculation device that controls the parts connected by the bus line 36. The flash ROM 31 is a rewritable non-volatile memory and has a control program 31a, a scale table 31b, and a chord table 31c. When the control program 31a is executed by the CPU 30, a main process of FIG. 4 is executed. The scale table 31b is a data table storing notes included in each major scale. The scale table 31b will now be described with reference to FIG. 3(a).

FIG. 3(a) is a view schematically showing the scale table 31b. Notes included in each major scale are stored in the scale table 31b. For example, do, re, mi, fa, sol, la, si, and do are included in the C major scale. Therefore, "O" indicating that these notes are included in the C major scale is stored in areas in the scale table 31b which correspond to the C major scale (represented as "C" in FIG. 3(a)) and correspond to the notes. On the other hand, #do (representing a semitone above do, which is the same for other notes), #re, #fa, #sol, and #la are not included in the C major scale. Therefore, "X" indicating that these notes are not included in the C major scale is stored in areas in the scale table 31b which correspond to the C major scale and correspond to the notes.

In each of the other major scales such as C #, D, D #, and E in the scale table 31b, "O" is stored for notes that are included in the major scale and "X" is stored for notes that are not included in the major scale, similar to the C major scale.

Returning to FIG. 2, the chord table 31c is a data table storing notes included in each chord. Here, the scale table 31b will be described with reference to FIG. 3(b).

FIG. 3(b) is a view schematically showing the chord table 31c. The chord table 31c stores notes included in each chord. For example, do, mi, and sol are stored in the C major chord (C). Therefore, "O" indicating that these notes are included in the C major chord is stored in areas in the chord table 31c which correspond to the C major chord (represented as "C" in FIG. 3(b)) and correspond to the notes. On the other hand, #do, re, #re, fa, #fa, #sol, la, #la, and si are not included in the C major chord. Therefore, "X" indicating that these notes are not included in the C major chord is stored in areas in the chord table 31c which correspond to the C major chord and correspond to the notes.

In areas in the chord table 31c corresponding to each of the C seventh chord (C7), the C major seventh chord (CM7), the C augmented chord (Caug), the C minor chord (Cm), and the C minor seventh chord (Cm7), the C diminished chord (Cdim), the C minor seventh flat five chord (Cm7♭5), and the like in addition to the C major chord, "O" is stored for notes that are included in the chord and "X" is stored for notes that are not included in the chord. Also, chords of D, E, and so on are also stored, similar to those of C.

Further, the chords stored in the chord table 31c are classified into two chord types, a "major chord type" which is similar to major chords in hearing impressions, and a "minor chord type" which is similar to minor chords in hearing impressions. In the present embodiment, major chords, seventh chords, major seventh chords, augmented chords, and the like are classified into the major chord type, and minor chords, minor seventh chords, diminished chords and minor seventh flat five chords, and the like are classified into the minor chord type.

Returning to FIG. 2, the RAM 32 is a memory for rewritably storing various work data, flags and the like when the CPU 30 executes a program such as the control program 31a, and includes a pitch memory 32a that stores the pitch of a voice input through the microphone M, a key memory 32b that stores the key of a scale, an estimated key memory 32c that stores an estimated key, which is a key estimated on the basis of performance information input through the input device 34 which will be described later (an example of the key storage portion 14 in FIG. 1), a chord memory 32d that stores a chord determined from performance information input through the input device 34 which will be described later, a first shift amount memory 32e and a second shift amount memory 32f that store pitch shift amounts for the voice input through the microphone M, and a chord type memory 32g that stores the (major or minor) chord type of the chord stored in the chord memory 32d.

The input device 34 is a device for inputting performance information from a musical instrument such as an electronic musical instrument or an electric musical instrument. In the present embodiment, an electric guitar G is connected to the input device 34, and performance information based on the live performance on the electric guitar G is input to the harmony generation device 1 via the input device 34. The musical instrument connected to the input device 34 is not limited to the electric guitar G and other musical instruments such as an electric base, an electronic piano, or an electronic organ may also be connected thereto.

The DSP 35 is a calculation device for generating first and second harmony tones and synthesizing the first and second harmony tones and the voice input through the microphone M. The DAC 37 is a conversion device that converts waveform data input from the DSP 35 into analog waveform data. The amplifier 38 is an amplifying device that amplifies the analog waveform data output from the DAC 37 with a predetermined gain, and the speaker 39 is an output device that emits (outputs) the analog waveform data amplified by the amplifier 38 as a musical sound.

Next, a main process executed by the CPU 30 will be described with reference to FIG. 4 to FIG. 8(b). FIG. 4 is a flowchart of the main process. The main process is executed after the harmony generation device 1 is powered on. In the main process, first, the CPU 30 acquires the pitch of a voice acquired from the microphone M and stores the acquired pitch in the pitch memory 32a (S1). The CPU 30 that executes the process of S1 is an example of the pitch detection 17 in the pitch shift portion 16 in FIG. 1.

After the process of S1, the CPU 30 determines a chord from performance information of the electric guitar G input through the input device 34 and stores the determined chord in the chord memory 32d (S2). The CPU 30 that executes the process of S2 is an example of the chord determination portion 12 in FIG. 1.

After the process of S2, the CPU 30 estimates a key of the scale of a piece of music being played on the electric guitar G on the basis of the chord in the chord memory 32d (S3). Specifically, the CPU 30 collects tones used in the chord in the chord memory 32d, which have been acquired over a predetermined time (for example, 30 seconds), by referring to the chord table 31c. Then, the CPU 30 estimates a scale of degrees most similar to a scale composed of tones collected within the predetermined time, from the scale table 31b, and acquires the key of the scale.

After the process of S3, the CPU 30 checks whether or not the key can be estimated in the process of S3 (S4) and stores the key in the estimated key memory 32c when the key can be estimated in the process of S3 (S4: Yes) (S5). In this way, the key based on the chord being played on the electric guitar G, i.e., the estimated key, is stored in the estimated key memory 32c. On the other hand, when the key cannot be estimated in the process of S3 (S4: No), the CPU 30 skips the process of S5. The CPU 30 that executes the processes of S3 to S5 is an example of the key estimation portion 13 in FIG. 1.

After the processes of S4 and S5, the CPU 30 checks whether or not a key selection mode that has been set through the setting button 33 is an "automatic key selection mode" (S6). The key selection mode set through the setting button 33 is a mode for selecting which key to use when calculating a first shift amount and a second shift amount (hereinafter referred to as first and second shift amounts) that are shift amounts by which to shift the voice input through the microphone M in a harmony generation process which will be described later with reference to FIG. 5. In the present embodiment, a "set key mode" in which the first and second shift amounts are calculated on the basis of a key set in advance through the setting button 33, i.e., a set key, and the "automatic key selection mode" in which the first and second shift amounts are calculated on the basis of one of the set key and the estimated key stored in the estimated key memory 32c according to the state of the estimated key in the estimated key memory 32c are provided.

Upon determining in the process of S6 that the key selection mode set through the setting button 33 is the "automatic key selection mode" (S6: Yes), first, the CPU 30 checks whether or not a key has been stored in the estimated key memory 32c (S7). In the process of S7, the CPU 30 checks the storage state of the estimated key memory 32c (whether or not an estimated key has been stored therein) since there may be cases where the key estimated through the process of S3 has not yet been stored in the estimated key memory 32c, such as immediately after the harmony generation device 1 is powered on or when the electric guitar G has not been played after the harmony generation device 1 is powered on.

Upon determining in the process of S7 that a key has been stored in the estimated key memory 32c (S7: Yes), the CPU 30 stores the estimated key of the estimated key memory 32c in the key memory 32b (S8). On the other hand, when a key has not been stored in the estimated key memory 32c (S7: Yes), the CPU 30 stores the set key, which has been set through the setting button 33, in the key memory 32b (S9). The key in the key memory 32b set in the processes of S8 and S9 is used to calculate the first and second shift amounts in the harmony generation process.

That is, when the key selection mode is the automatic key selection mode, the first and second shift amounts are calculated on the basis of the set key, which has been set in advance through the setting button 33, until a key is estimated through the processes of S3 to S5 after the harmony generation device 1 is powered on. Therefore, it is possible to prevent incidents where it is not possible to calculate the first and second shift amounts since no key has been estimated. Then, after a key is estimated, the first and second shift amounts are calculated on the basis of the estimated key. Therefore, after a key is estimated, it is possible to output a more natural harmony sound based on the chord being played on the electric guitar G.

Further, even if the piece of music being played on the electric guitar G modulates such that the major scale has changed, the key of the major scale of the piece of music after modulation is estimated through the process of S3 since key estimation is repeatedly executed through the processes of S3 to S5. Therefore, even if the piece of music being played on the electric guitar G modulates, a harmony sound based on the modulated key is output, such that the harmony sound can harmonize with the piece of music being played on the electric guitar G.

After the processes of S8 and S9, the CPU 30 executes the harmony generation process (S10). Here, the harmony generation process will be described with reference to FIG. 5 to FIG. 8(b).

Figure 5:
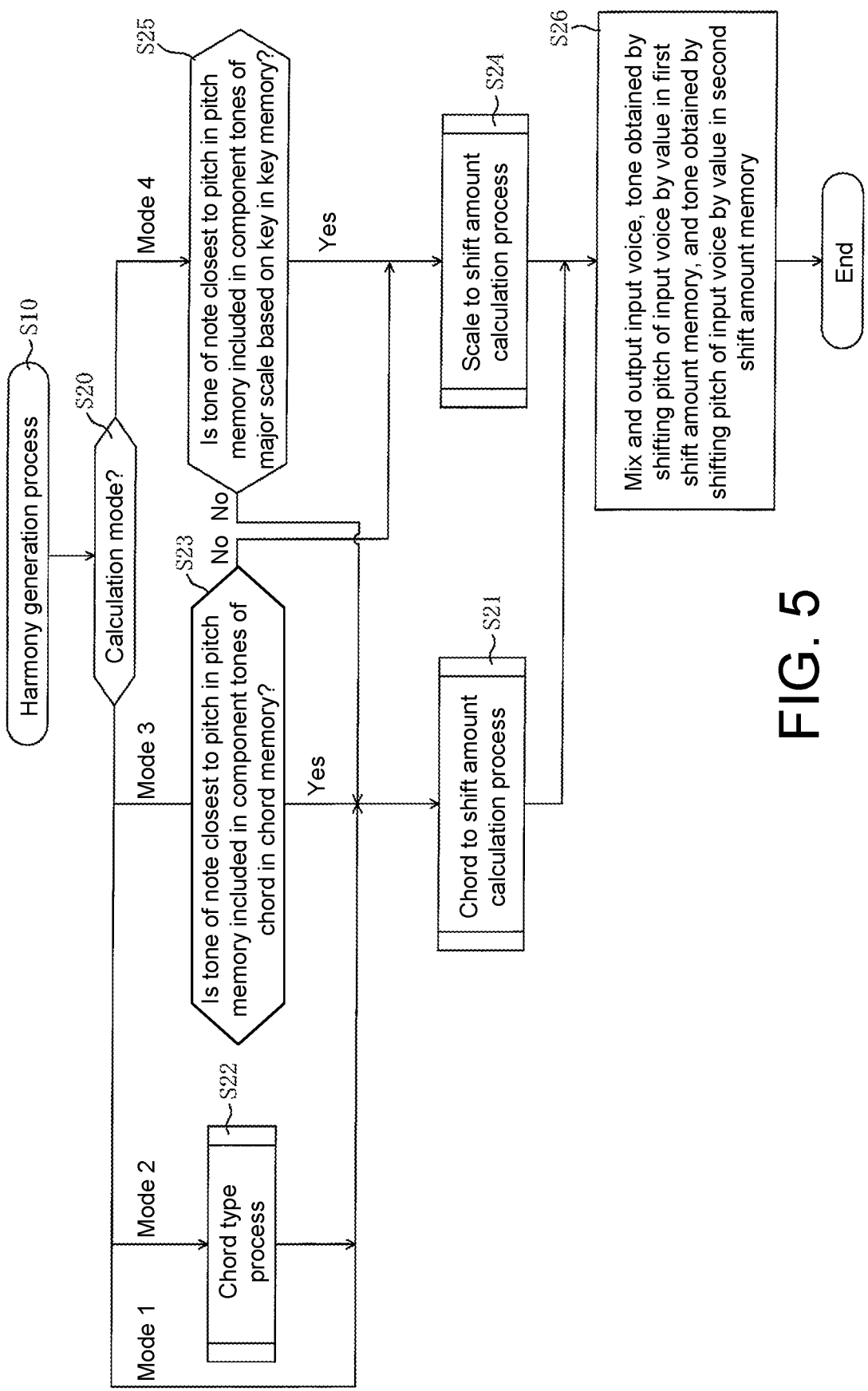
FIG. 5 is a flowchart of a harmony generation process.

FIG. 5 is a flowchart of the harmony generation process. The harmony generation process is a process of calculating first and second shift amounts on the basis of the pitch in the pitch memory 32a, the chord in the chord memory 32d, and a major scale of the key in the key memory 32b, mixing a voice input through the microphone M with tones obtained by shifting the pitch of the input voice by the first and second shift amounts, and outputting the mixture as a harmony sound.

In the harmony generation process, first, the CPU 30 checks the calculation mode set through the setting button 33 (S20). In the present embodiment, modes 1 to 4 are provided for the calculation mode. The mode 1 is a mode in which the first and second shift amounts are calculated on the basis of the chord in the chord memory 32d, the mode 2 is a mode in which the first and second shift amounts are calculated on the basis of the (major or minor) chord type of the chord in the chord memory 32d, and the modes 3 and 4 are modes in which the first and second shift amounts are calculated on the basis of the chord in the chord memory 32d and the scale of the key stored in the key memory 32b.

In the mode 3 out of the modes 3 and 4, the first and second shift amounts are calculated with priority given to the chord in the chord memory 32d over the scale of the key in the key memory 32b. In the mode 4, the first and second shift amounts are calculated with priority given to the scale of the key in the key memory 32b over the chord in the chord memory 32d.

When the calculation mode set through the setting button 33 is the mode 1 (S20: mode 1), the CPU 30 executes a chord to shift amount calculation process (S21). Here, the chord to shift amount calculation process will be described with reference to FIG. 6(a) and FIG. 6(b).

Figure 6A:
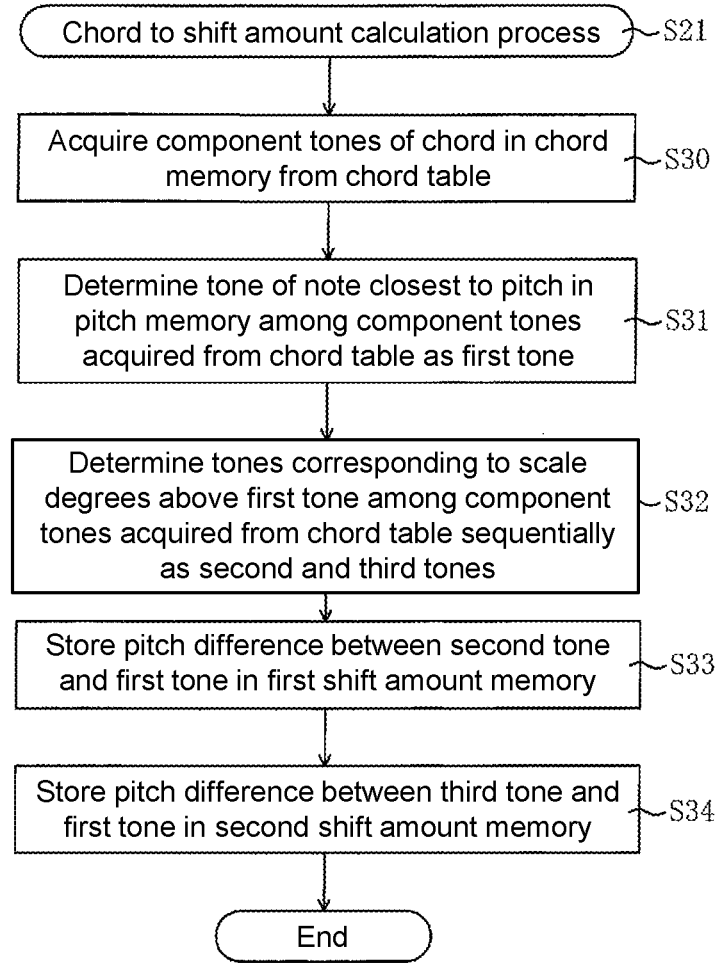
FIG. 6(a) is a flowchart of a chord to shift amount calculation process and FIG. 6(b) is a schematic view illustrating details of the process.
Figure 6B:
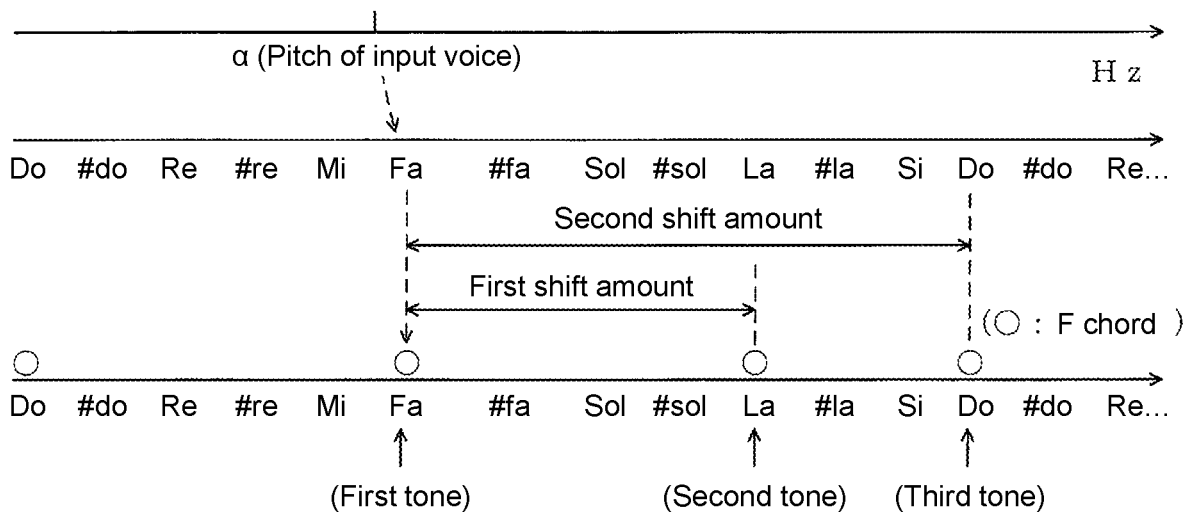

FIG. 6(a) is a flowchart of the chord to shift amount calculation process and FIG. 6(b) is a schematic view illustrating details of the process. The chord to shift amount calculation process is a process of calculating the first and second shift amounts on the basis of the chord in the chord memory 32d. In the chord to shift amount calculation process, first, the CPU 30 acquires component tones of the chord stored in the chord memory 32d, that is, tones of notes corresponding to "O" in the chord table 31c of FIG. 3(b), from the chord table 31c (S30). FIG. 6(b) shows an example in which the F chord is stored in the chord memory 32d. In FIG. 6(b), "O" indicating the component tones of the F chord is written at fa, la and do since the component tones of the F chord are fa, la and do.

After the process of S30, the CPU 30 determines the tone of a note closest to the pitch in the pitch memory 32a among the component tones acquired from the chord table 31c as a first tone (S31). In the example of FIG. 6(b), if the pitch in the pitch memory 32a is α Hz (α>0), "fa" whose pitch is closest to α Hz among the component tones acquired from the chord table 31c is determined as the "first tone" through the process of S31. A second tone and a third tone for calculating the first and second shift amounts, which are component tones acquired from the chord table 31c on the basis of the first tone, are acquired through the following process of S32.

Specifically, after the process of S31, the CPU 30 determines tones corresponding to scale degrees above the first tone acquired in the process of S31 among the component tones acquired from the chord table 31c sequentially as second and third tones (S32). In FIG. 6(b), since "fa" is determined as the "first tone" through the process of S31, "la" which is the tone of a scale degree which is the first above "fa" among the component tones acquired from the chord table 31c is determined as the second tone and further "do" which is the tone of a scale degree which is the first above "la" among the component tones is determined as the third tone. First and second shift amounts for shifting the pitch of the voice input through the microphone M such that the shifted tones are equivalent to the second and third tones thus acquired are calculated through the following processes of S33 and S34.

After the process of S32, the CPU 30 calculates the first shift amount which is the pitch difference between the second tone and the first tone and stores it in the first shift amount memory 32e (S33) and further calculates the second shift amount which is the pitch difference between the third tone and the first tone and stores it in the second shift amount memory 32*f* (S34), and terminates the chord to shift amount calculation process. This chord to shift amount calculation process of S21 is an example of the shift amount calculation 18 of the pitch shift portion 16 in FIG. 1.

As details will be described later in the process of S26 in FIG. 5, first and second harmony tones are generated by shifting the pitch of the voice input through the microphone M by the first and second shift amounts and are mixed with the input voice and the mixture is output.

As described above, when the calculation mode is the mode 1, the first and second shift amounts are calculated on the basis of the chord in the chord memory 32*d*, that is, the chord being played on the electric guitar G, through the chord to shift amount calculation process. Therefore, the first and second harmony tones have pitches based on some of the component tones of the chord in the chord memory 32*d* (specifically, the second and third tones), such that the harmony sound output from the harmony generation device 1 can harmonize with the chord played on the electric guitar G.

Further, the harmony generation device 1 cannot read the chord played on the electric guitar G in advance since the chord played on the electric guitar G changes from moment to moment as the piece of music progresses. Therefore, through the process of S2 of FIG. 4, a chord is determined on the basis of performance information input through the input device 34, and first and second shift amounts are calculated on the basis of the chord. First and second harmony tones generated using the first and second shift amounts can change from moment to moment based on changes in the chord played on the electric guitar G. Thus, the harmony generation device 1 can output a natural harmony sound that harmonizes with the chord and is rich in variation according to the chord that changes from moment to moment.

Furthermore, since the first shift amount is the pitch difference between the second tone and the first tone and the second shift amount is the pitch difference between the third tone and the first tone, the pitch difference between the voice input through the microphone M and the first harmony tone is made equivalent to the pitch difference between the first tone and the second tone and the pitch difference between the voice and the second harmony tone is made equivalent to the pitch difference between the first tone and the third tone.

Returning to FIG. 5, upon determining in the process of S20 that the calculation mode set through the setting button 33 is the mode 2 (S20: mode 2), first, the CPU 30 executes a chord type process (S22). Here, the chord type process will be described with reference to FIG. 7.

Figure 7:
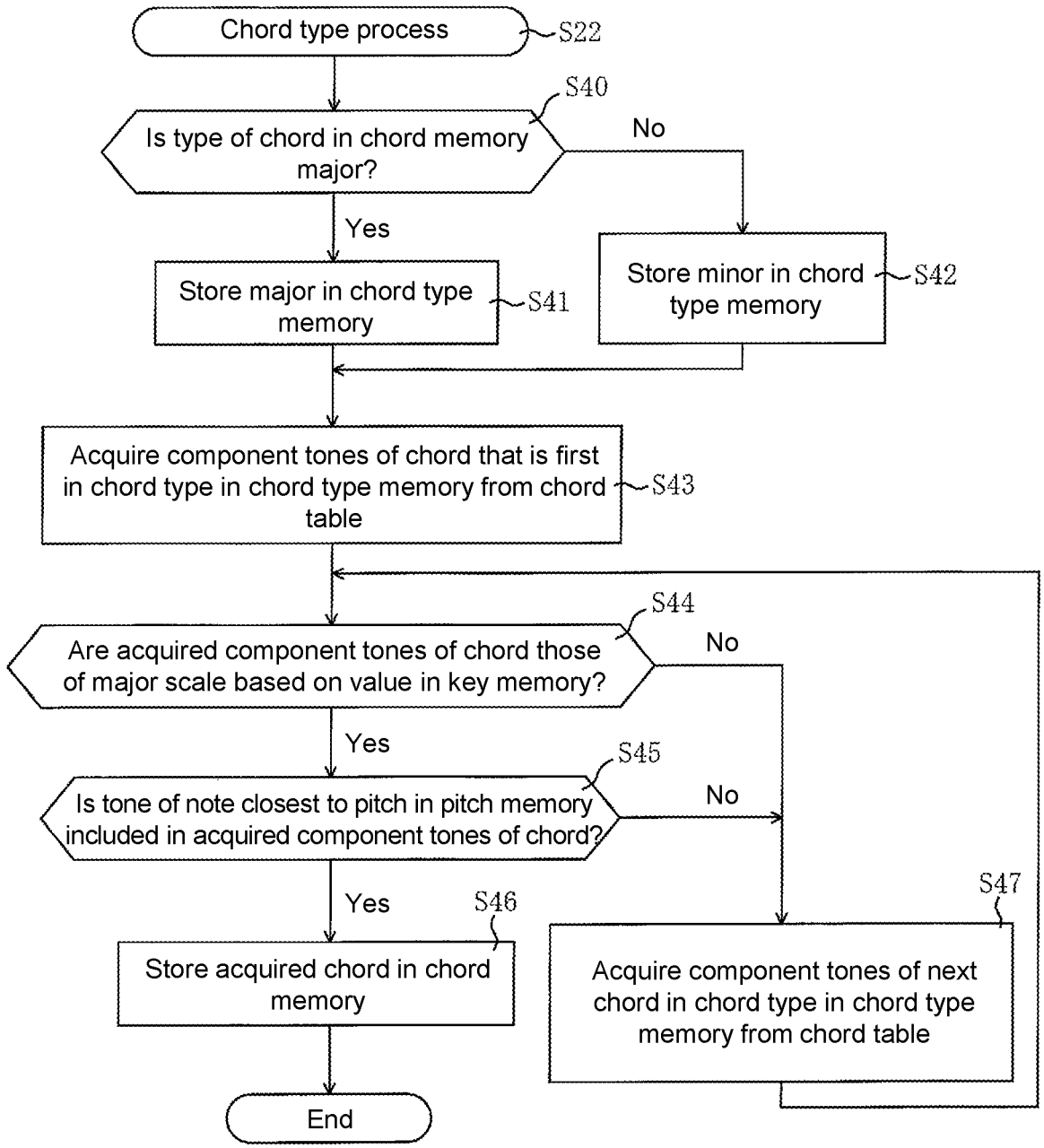
FIG. 7 is a flowchart of a chord type process.

FIG. 7 is a flowchart of the chord type process. The chord type process is a process of determining whether the chord type is major or minor on the basis of the chord in the chord memory 32*d* and storing a chord based on both the determined chord type and the key in the key memory 32*b* in the chord memory 32*d*.

In the chord type process, first, the CPU 30 refers to the chord in the chord memory 32*d* in the chord table 31*c* and checks whether the chord type of a chord in the chord table 31*c* that matches the chord in the chord memory 32*d* is major or minor (S40). The CPU 30 stores "major" in the chord type memory 32*g* (S41) upon determining in the process of S40 that the chord in the chord memory 32*d* is major (S40: Yes) and stores "minor" in the chord type memory 32*g* (S42) upon determining in the process of S40 that the chord in the chord memory 32*d* is not major, i.e., minor (S40: No).

After the processes of S41 and S42, the CPU 30 acquires component tones of a chord, which is stored first in the chord type in the chord type memory 32*g*, from the chord table 31*c* (S43). From the chord table 31*c* of FIG. 3(*b*), the component tones of the C chord are acquired through the process of S43 when the chord type in the chord type memory 32*g* is major and the component tones of the Cm chord are acquired through the process of S43 when the chord type in the chord type memory 32*g* is minor.

After the process of S43, the CPU 30 checks whether or not the component tones of the chord acquired in the process of S43 or S47 which will be described later are those of a major scale based on the key in the key memory 32*b* (S44). Specifically, the CPU 30 acquires the component tones of the major scale based on the key in the key memory 32*b* from the scale table 31*b* (FIG. 3(*a*)) and checks whether or not the component tones of the chord acquired in the process of S43 or S47 are all included in the acquired component tones of the major scale.

Upon determining in the process of S44 that the component tones of the chord acquired in the process of S43 or S47 are those of the major scale based on the key in the key memory 32*b* (S44: Yes), the CPU 30 further checks whether or not the tone of a note closest to the pitch in the pitch memory 32*a* is included in the component tones of the chord acquired in the process of S43 or S47 (S45). When the tone of the note closest to the pitch in the pitch memory 32*a* is included in the component tones of the chord acquired in the process of S43 or S47 (S45: Yes), the CPU 30 stores the chord acquired in the process of S43 or S47 in the chord memory 32*d* (S46).

Upon determining in the process of S44 that the component tones of the chord acquired in the process of S43 or S47 are not those of the major scale based on the key in the key memory 32*b* (S44: No) or upon determining in the process of S45 that the tone of the note closest to the pitch in the pitch memory 32*a* is not included in the component tones of the chord acquired in the process of S43 or S47 (S45: No), in order to compare them with component tones of other chords in each chord type, the CPU 30 acquires component tones of a chord next to the chord acquired from the chord table 31*c* in the immediately previous process of S43 or S47 (S47) and repeats the process of S43. Then, after the process of S46, the CPU 30 terminates the chord type process and returns to the harmony generation process of FIG. 6(*a*) and FIG. 6(*b*).

Returning to FIG. 5, the CPU 30 executes the chord to shift amount calculation process (S21) of FIG. 6(*a*) after the chord type process of S22.

As can be seen from the above, when the calculation mode is the mode 2, a chord type is acquired from the chord in the chord memory 32*d* stored in advance and a chord in the acquired chord type, whose component tones are all included in a major scale based on the key in the key memory 32*b*, is stored in the chord memory 32*d* through the chord type process of S22. Then, first and second shift amounts are calculated on the basis of the chord in the chord memory 32*d* through the chord to shift amount calculation process of S21.

The component tones of the chord played on the electric guitar G are not necessarily included in the component tones of the major scale based on the key in the key memory 32*b*. Thus, if the first and second shift amounts are calculated on the basis of the chord played on the electric guitar G, a sound away from the tune being played may be output since first and second harmony tones deviating from the component tones of the major scale based on the key in the key memory 32b are generated.

Therefore, when not all component tones of the chord played on the electric guitar G are included in the component tones of the major scale based on the key of the key memory 32b, first and second shift amounts are calculated using another chord in the same chord type which includes the tone of the note closest to the pitch in the pitch memory 32a. Since first and second harmony tones generated on the basis of the first and second shift amounts are both tones that are based on the major scale based on the key in the key memory 32b, the harmony generation device 1 can output a harmony sound harmonizing with the tune being played.

Further, the first and second harmony tones are tones that are based on a chord in the same chord type as that of a chord played on the electric guitar G, and these are similar in hearing impressions. Therefore, it is possible to minimize the sense of discomfort in hearing when the first and second harmony tones and the chord played on the electric guitar G are mixed.

Upon determining in the process of S20 that the calculation mode set through the setting button 33 is the mode 3 (S20: mode 3), the CPU 30 checks whether or not the tone of the note closest to the pitch in the pitch memory 32a is included in the component tones of the chord in the chord memory 32d (S23). Specifically, the CPU 30 determines whether or not the same component tone as that of the note closest to the pitch in the pitch memory 32a is included in the component tones of the chord in the chord memory 32d.

The CPU 30 executes the chord to shift amount calculation process of FIG. 6(a) (S21) upon determining in the process of S23 that the tone of the note closest to the pitch in the pitch memory 32a is included in the component tones of the chord in the chord memory 32d (S23: Yes) and executes a scale to shift amount calculation process (S24) upon determining that it is not included in the component tones of the chord in the chord memory 32d (S23: No). Here, the scale to shift amount calculation process of S24 will be described with reference to FIG. 8(a) and FIG. 8(b).

Figure 8A:
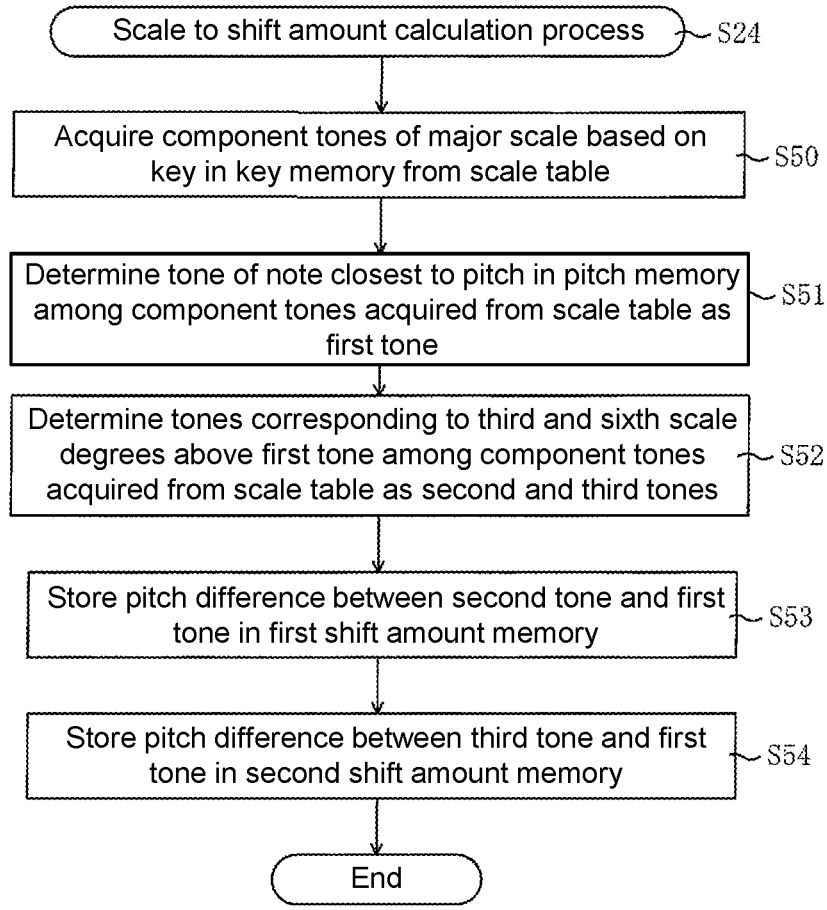
FIG. 8(a) is a flowchart of a scale to shift amount calculation process and FIG. 8(b) is a schematic view illustrating details of the process.
Figure 8B:
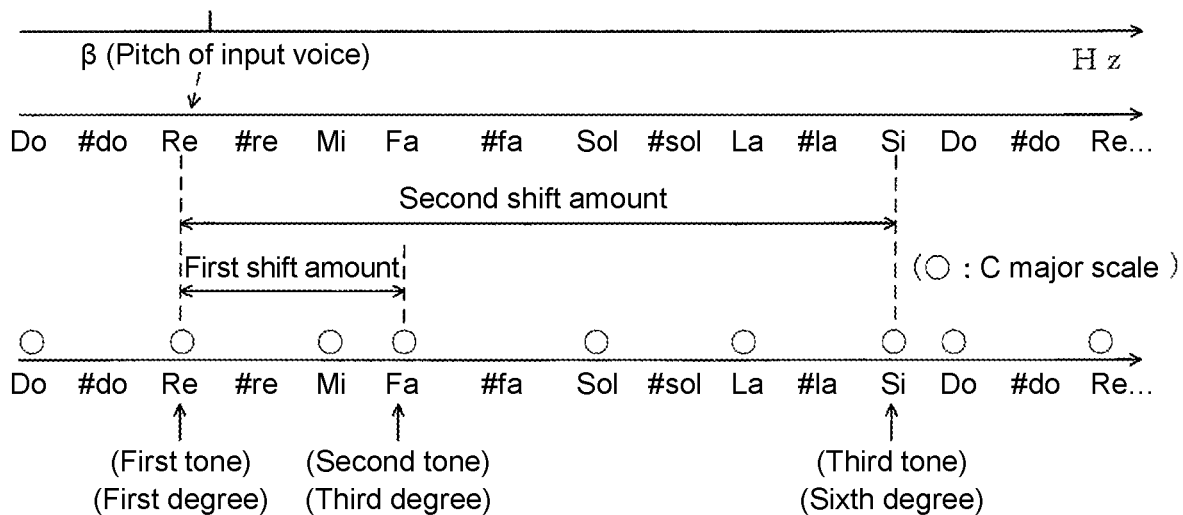

FIG. 8(a) is a flowchart of the scale to shift amount calculation process and FIG. 8(b) is a schematic view illustrating details of the process. The scale to shift amount calculation process is a process of calculating the first and second shift amounts on the basis of a major scale based on the key in the key memory 32b.

In the scale to shift amount calculation process, first, the CPU 30 acquires component tones of a major scale based on the key in the key memory 32b, that is, tones of notes corresponding to "O" in the scale table 31b of FIG. 3(a), from the scale table 31b (S50). FIG. 8(b) shows an example in which "C (C major)" is stored as a key in the key memory 32b. Since the component tones of the C major scale are do, re, mi, fa, sol, la, and si, "O" indicating the component tones of the C major scale is also written at these notes in FIG. 8(b).

After the process of S50, the CPU 30 determines the tone of a note closest to the pitch in the pitch memory 32a among the component tones acquired from the scale table 31b as a first tone (S51). In the example of FIG. 8(b), if the pitch in the pitch memory 32a is β Hz (β>0), "re" whose pitch is closest to β Hz among the component tones acquired from the scale table 31b is determined as the first tone through the process of S51. A second tone and a third tone for calculating the first and second shift amounts, which are component tones acquired from the scale table 31b with respect to the first tone as the first degree, are acquired through the following process of S52.

Specifically, after the process of S51, the CPU 30 determines the tones of third and sixth degrees above the first tone acquired in the process of S51 among the component tones acquired from the scale table 31b sequentially as second and third tones (S52). In FIG. 8(b), since "re" is determined as the "first tone" through the process of S51, "fa" which is the tone of the third degree above "re" among the component tones acquired from the scale table 31b is determined as the second tone and further "si" which is the tone of the sixth degree above "re" is determined as the third tone. First and second shift amounts for shifting the pitch of the voice input through the microphone M such that the shifted tones are equivalent to the second and third tones thus acquired are calculated through the following processes of S53 and S54.

The second tone and the third tone are not limited to the tones of the third and sixth degrees above the first tone among the component tones acquired from the scale table 31b, and the second tone may be the tone of the second, fourth, or higher degree above the first tone and the third tone may be the tone of the fourth, fifth, seventh, or higher degree above the first tone.

After the process of S52, the CPU 30 calculates the first shift amount which is the pitch difference between the second tone and the first tone and stores it in the first shift amount memory 32e (S53) and further calculates the second shift amount which is the pitch difference between the third tone and the first tone and stores it in the second shift amount memory 32f (S54), and terminates the scale to shift amount calculation process. This scale to shift amount calculation process of S24 is an example of the shift amount calculation 18 of the pitch shift portion 16 in FIG. 1.

The first and second harmony tones based on the first and second shift amounts calculated through the scale to shift amount calculation process have pitches based on some of the component tones of the major scale based on the key in the key memory 32b (specifically, pitches based on the second and third tones determined in the process of S52). Therefore, by the first and second harmony tones, it is possible to output a harmony sound harmonizing with the tune being played. In addition, unlike the first and second shift amounts calculated in the chord to shift amount calculation process, the first and second shift amounts calculated through the scale to shift amount calculation process do not change according to changes in the chord. Therefore, it is possible to stabilize changes in the first and second harmony tones.

Also in the scale to shift amount calculation process, since the first shift amount is the pitch difference between the second tone and the first tone and the second shift amount is the pitch difference between the third tone and the first tone, the pitch difference between the voice input through the microphone M and the first harmony tone is made equivalent to the pitch difference between the first tone and the second tone and the pitch difference between the voice and the second harmony tone is made equivalent to the pitch difference between the first tone and the third tone, similar to the chord to shift amount calculation process of FIG. 6(a).

As can be seen from the above, when the calculation mode is the mode 3, first, the CPU 30 checks whether or not the tone of a note closest to the pitch in the pitch memory 32a is included in the component tones of the chord in the chord memory 32d. When the tone of the note closest to the pitch in the pitch memory 32a is included in the component tones of the chord in the chord memory 32d, first and second shift amounts are calculated on the basis of the chord in the chord memory 32d through the chord to shift amount calculation process. That is, since calculation of the first and second shift amounts based on the chord in the chord memory 32d is given priority over calculation of the first and second shift amounts based on the major scale based on the key in the key memory 32b, it is possible to preferentially generate first and second harmony tones that are rich in variation according to changes in the chord in the chord memory 32d.

On the other hand, when the tone of the note closest to the pitch in the pitch memory 32a is not included in the component tones of the chord in the chord memory 32d, first and second shift amounts are calculated from the major scale based on the key in the key memory 32b through the scale to shift amount calculation process. Therefore, even if the first and second shift amounts cannot be calculated from the component tones of the chord in the chord memory 32d, it is possible to generate first and second harmony tones corresponding to the major scale based on the key in the key memory 32b, i.e., harmonizing with the tune being played, and thus it is possible to minimize the sense of discomfort in hearing on the output harmony sound.

Returning to FIG. 5, upon determining in the process of S20 that the calculation mode is the mode 4, the CPU 30 checks whether or not the tone of the note closest to the pitch in the pitch memory 32a is included in the component tones of the major scale based on the key in the key memory 32b (S25). Specifically, the CPU 30 determines whether or not the same component tone as the note closest to the pitch in the pitch memory 32a is included in the component tones of the major scale based on the key in the key memory 32b.

Upon determining in the process of S25 that the tone of the note closest to the pitch in the pitch memory 32a is included in the component tones of the major scale based on the key in the key memory 32b (S25: Yes), the CPU 30 executes the scale to shift amount calculation process of FIG. 8(a) (S24) to calculate first and second shift amounts from the component tones of the major scale based on the key in the key memory 32b. On the other hand, upon determining that the tone of the note closest to the pitch in the pitch memory 32a is not included in the component tones of the major scale based on the key in the key memory 32b (S25: No), the CPU 30 executes the chord to shift amount calculation process of FIG. 6(a) (S21).

As can be seen from the above, when the calculation mode is the mode 4, first, the CPU 30 checks whether or not the tone of a note closest to the pitch in the pitch memory 32a is included in the component tones of a major scale based on the key in the key memory 32b. When the tone of the note closest to the pitch in the pitch memory 32a is included in the component tones of the major scale, first and second shift amounts are calculated on the basis of the major scale through the scale to shift amount calculation process. That is, since calculation of the first and second shift amounts based on the major scale is given priority over calculation of the first and second shift amounts based on the chord in the chord memory 32d, it is possible to preferentially output first and second harmony tones harmonizing with the tune being played.

On the other hand, when the tone of the note closest to the pitch in the pitch memory 32a is not included in the component tones of the major scale based on the key in the key memory 32b, first and second shift amounts are calculated from the chord in the chord memory 32d through the chord to shift amount calculation process. That is, even if the first and second shift amounts cannot be calculated from the component tones of the major scale, it is possible to generate first and second harmony tones at least harmonizing with the chord in the chord memory 32d, and thus it is possible to minimize the sense of discomfort in hearing on the output harmony sound.

After the processes of S21 and S24, the CPU 30 mixes and outputs the voice input through the microphone M, the first harmony tone obtained by shifting the pitch of the voice input through the microphone M by the value in the first shift amount memory 32e, and the second harmony tone obtained by shifting the pitch of the voice input through the microphone M by the value in the second shift amount memory 32f (S26). The process of S26 is an example of a combination of the first pitch shift 19 and the second pitch shift 20 in the pitch shift portion 16 and the output portion 21 in FIG. 1. After the process of S26, the CPU 30 terminates the harmony generation process and returns to the main process of FIG. 4.

As described above, in the harmony generation process, first and second harmony tones of different modes are generated according to the calculation modes (the modes 1 to 4) set through the setting button 33. Thus, by setting the calculation mode in agreement with the tune or the like of the piece of music being played, it is possible to output a harmony sound of a mode that matches the tune. In addition, by appropriately changing the calculation mode according to the progress of the piece of music being played, for example, according to modulation or the electric guitar G not being played, it is possible to output a harmony sound that is rich in expression and flexible with respect to the progress of the piece of music.

Returning to FIG. 4, the CPU 30 repeats the process from S1 onward after executing the harmony generation process of S10.

As described above on the basis of the above embodiment, it can be easily understood that various improvements and changes are possible.

The above embodiment illustrates the harmony generation device 1 into which the control program 31a is incorporated. However, the disclosure is not necessarily limited to this and may employ a configuration in which the control program 31a is incorporated into another electronic musical instrument such as an electronic piano or a synthesizer or an information processing device such as a personal computer, a smartphone, or a tablet terminal, such that this instrument or device outputs a harmony sound.

The above embodiment is configured such that the input device 34 (FIG. 2) is connected to the harmony generation device 1 to input performance information of the musical instrument such as the electric guitar G connected to the input device 34. However, the disclosure is not necessarily limited to this and may employ a configuration in which, instead of the input device 34, a MIDI interface for inputting performance information from MIDI data is connected and harmony tones are generated on the basis of performance information based on MIDI data input through the MIDI interface. With this configuration, it is possible to generate, using MIDI data input through the MIDI interface, the same harmony tones as when playing a musical instrument. In addition, for example, if MIDI data from a MIDI file for karaoke accompaniment tones is input through the MIDI interface, it is possible to mix natural harmony tones based on the chord progression of karaoke accompaniment tones with karaoke singing and output the mixture.

The above embodiment is configured such that the scale table 31b stores notes included in each major scale. However, the scale stored in the scale table 31b is not limited to a major scale and it is also possible to employ a configuration in which a scale such as a harmonic minor scale is stored together with a major scale or a configuration in which another scale such as a harmonic minor scale is stored alone.

The above embodiment is configured such that two shift amounts, the first and second shift amounts, are calculated through the chord to shift amount calculation process of S21 (FIG. 6(a)) and the scale to shift amount calculation process of S24 (FIG. 8(a)) to generate two harmony tones, the first and second harmony tones. However, the disclosure is not necessarily limited to this, and a single shift amount may be calculated through the chord to shift amount calculation process and the scale to shift amount calculation process and a single harmony tone may be generated using the shift amount.

In this case, in the chord to shift amount calculation process, a shift amount may be calculated on the basis of the tone of a scale degree above the first tone acquired in the process of S31, which is a component tone acquired from the chord table 31c in the process of S30, or a shift amount may be calculated on the basis of the tone of a scale degree below the first tone. In the scale to shift amount calculation process, a shift amount may be calculated on the basis of the tone of a third or sixth degree above the first tone acquired in the process of S51, which is a component tone acquired from the scale table 31b in the process of S50 or a shift amount may be calculated on the basis of the tone of a third or sixth degree below the first tone.

Three or more shift amounts may also be calculated through the chord to shift amount calculation process and the scale to shift amount calculation process and three or more harmony tones may be generated using the shift amounts.

The above embodiment is configured such that, through the chord to shift amount calculation process of S21, first and second shift amounts are calculated on the basis of two tones of scale degrees above the first tone acquired in the process of S31, which are component tones of the chord acquired from the chord table 31c in the process of S30. However, the disclosure is not necessarily limited to this, and first and second shift amounts may be calculated using two tones of scale degrees below the first tone, which are component tones of the chord, as second and third tones, respectively, or first and second shift amounts may be calculated using the tone of a scale degree below the first tone and the tone of a scale degree above the first tone, which are component tones of the chord, as second and third tones, respectively.

The above embodiment is configured such that, through the scale to shift amount calculation process of S24, first and second shift amounts are calculated on the basis of second and third tones that are third and sixth degrees above the first tone acquired in the process of S51, which are component tones acquired from the scale table 31b in the process of S50. However, the disclosure is not necessarily limited to this, and first and second shift amounts may be calculated using tones that are sixth and third degrees below the first tone, respectively, as second and third tones. First and second shift amounts may also be calculated using a tone that is a third degree below the first tone as a second tone and a tone that is a sixth degree above the first tone as a third tone, or first and second shift amounts may be calculated using a tone that is a sixth degree below the first tone as a second tone and a tone that is a third degree above the first tone as a third tone. That is, a tone that differs from the first tone by three degrees may be used as one of the second tone or the third tone and a tone that differs from the first tone by six degrees may be used as the other of the second tone or the third tone.

The above embodiment is configured such that, in the harmony generation process of FIG. 5, the chord type process of S22 is executed before the chord to shift amount calculation process of S21 is executed only when the calculation mode is the mode 2. However, the disclosure is not necessarily limited to this, and may employ a configuration in which, even when the calculation mode is another mode (especially, the mode 3 or the mode 4), the chord type process of S22 is executed before the chord to shift amount calculation process of S21 is executed. With this configuration, even when the first and second shift amounts are calculated in the chord to shift amount calculation process in a mode other than the mode 2, it is possible to achieve harmony with the tune being played and to output a harmony sound which minimizes the sense of discomfort in hearing when mixed with a chord played on the electric guitar G, similar to the case in the mode 2.

In the above embodiment, in the process of S26 of FIG. 5, the voice input through the microphone M is mixed with the first and second harmony tones as it is and then the mixture is output. However, the disclosure is not necessarily limited to this. For example, a separate effect process such as reverb or pitch shift which does not depend on the first and second shift amounts may be applied to the voice input through the microphone M and then this sound may be mixed with the first and second harmony tones and then the mixture may be output.

In the above embodiment, in the chord to shift amount calculation process and the scale to shift amount calculation process of FIG. 6(a) and FIG. 8(a), the first and second shift amounts are the respective pitch differences between the second and third tones and the first tone. However, the disclosure is not necessarily limited to this, and the first and second shift amounts may be the respective pitch differences between the second and third tones and the pitch in the pitch memory 32a.

Numerical values stated in the above embodiment are merely examples and, of course, other numerical values may be employed.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A harmony generation device comprising:
    a voice input portion configured to input a voice;
    a performance input portion configured to input performance information of a musical instrument;
    a chord determination portion configured to determine a chord of the performance information input through the performance input portion;
    a pitch shift portion configured to shift a pitch of the voice input through the voice input portion on the basis of the chord determined by the chord determination portion in order to obtain a pitch tone;
    an output portion configured to output the pitch tone obtained from the shifting of the voice input through the voice input portion by the pitch shift portion; and
    a key storage portion configured to store a key of a piece of music being played,
    wherein the pitch shift portion is configured to shift the pitch of the voice input through the voice input portion on the basis of the chord determined by the chord determination portion and the key stored in the key storage portion,
wherein the pitch shift portion is configured to, when a tone of a note close to the pitch of the voice input through the voice input portion is a component tone included in component tones of a scale based on the key stored in the key storage portion, shift the pitch of the voice input through the voice input portion such that a sound with the same note or notes as one or two or more component tones that differ in pitch from the component tone is generated.

2. The harmony generation device according to claim 1, wherein the pitch shift portion is configured to shift the pitch of the voice input through the voice input portion such that a sound with the same note or notes as one or two or more component tones that are among component tones of the chord determined by the chord determination portion and that are not a tone of a note close to the pitch of the voice input through the voice input portion is generated.

3. The harmony generation device according to claim 1, wherein
the pitch shift portion is configured to, when a tone of a note close to the pitch of the voice input through the voice input portion is not included in the component tones of the scale based on the key stored in the key storage portion, shift the pitch of the voice input through the voice input portion such that a sound with the same note or notes as one or two or more component tones that are among component tones of the chord determined by the chord determination portion and that are not the tone of the note close to the pitch of the voice input through the voice input portion is generated.

4. The harmony generation device according to claim 3, wherein the pitch shift portion is configured to shift the pitch of the voice input through the voice input portion such that a sound with the same note or notes as one or two or more component tones that are among component tones of the chord determined by the chord determination portion and that are not a tone of a note close to the pitch of the voice input through the voice input portion is generated.

5. The harmony generation device according to claim 3, further comprising a key estimation portion configured to estimate the key of the piece of music being played on the basis of the chord determined by the chord determination portion,
wherein the key storage portion is configured to store the key estimated by the key estimation portion.

6. The harmony generation device according to claim 3, wherein the chord determination portion is configured to determine a chord as a chord being played, in which the chord include a tone of a note close to the pitch of the voice input through the voice input portion, and all component tones of the chord that are among component tones of a scale based on the key stored in the key storage portion.

7. The harmony generation device according to claim 1, further comprising a key estimation portion configured to estimate the key of the piece of music being played on the basis of the chord determined by the chord determination portion,
wherein the key storage portion is configured to store the key estimated by the key estimation portion.

8. The harmony generation device according to claim 1, wherein the chord determination portion is configured to determine a chord as a chord being played, in which the chord include a tone of a note close to the pitch of the voice input through the voice input portion, and all component tones of the chord that are among component tones of a scale based on the key stored in the key storage portion.

9. A storage medium storing a program for causing a computer to generate harmony according to an input voice, the program comprising:
a voice input step of inputting a voice of a user;
a performance input step of inputting performance information of a musical instrument;
a chord determination step of determining a chord of the performance information input by the performance input step;
a pitch shift step of shifting a pitch of the voice input by the voice input step on the basis of the chord determined by the chord determination step in order to obtain a pitch tone; and
an output step of outputting the pitch tone obtained from the shifting of the voice input through the voice input step by the pitch shift step, such that the program generates harmony according to the input voice; and
a key storage step of storing a key of a piece of music being played,
wherein in the pitch shift step, the pitch of the voice input by the voice input step is shifted on the basis of the chord determined by the chord determination step and the key stored by the key storage step,
wherein in the pitch shift step, when a tone of a note close to the pitch of the voice input by the voice input step is a component tone included in component tones of a scale based on the key stored by the key storage step, the pitch of the voice input by the voice input step is shifted such that a sound with the same note or notes as one or two or more component tones that differ in pitch from the component tone is generated, and
when a tone of a note close to the pitch of the voice input by the voice input step is not included in the component tones of the scale based on the key stored by the key storage step, the pitch of the voice input by the voice input step is shifted such that a sound with the same note or notes as one or two or more component tones that are among component tones of the chord determined by the chord determination step and that are not the tone of the note close to the pitch of the voice input by the voice input step is generated.

10. The harmony generation device according to claim 9, wherein the pitch shift portion is configured to shift the pitch of the voice input through the voice input portion such that a sound with the same note or notes as one or two or more component tones that are among component tones of the chord determined by the chord determination portion and that are not a tone of a note close to the pitch of the voice input through the voice input portion is generated.

11. The harmony generation device according to claim 9, further comprising a key estimation portion configured to estimate the key of the piece of music being played on the basis of the chord determined by the chord determination portion,
wherein the key storage portion is configured to store the key estimated by the key estimation portion.

12. The harmony generation device according to claim 9, wherein the chord determination portion is configured to determine a chord as a chord being played, in which the chord include a tone of a note close to the pitch of the voice input through the voice input portion, and all component tones of the chord that are among component tones of a scale based on the key stored in the key storage portion.

13. A harmony generation method comprising:
inputting a voice by a voice input portion;
inputting performance information of a musical instrument by a performance input portion;
determining a chord of the performance information by a chord determination portion;
shifting a pitch of the voice by a pitch shift portion on the basis of the chord determined by the chord determination portion, in order to obtain a pitch tone;
outputting the pitch tone obtained from the shifting of the voice by an output portion; and
storing a key of a piece of music being played in a key storage portion,
wherein the pitch of the voice is shifted on the basis of the chord determined by the chord determination portion and the key stored in the key storage portion,
wherein when a tone of a note close to the pitch of the voice input through the voice input portion is a component tone included in component tones of a scale based on the key stored in the key storage portion, the pitch of the voice input through the voice input portion is shifted such that a sound with the same note or notes as one or two or more component tones that differ in pitch from the component tone is generated.

14. The harmony generation method according to claim 13, wherein the pitch of the voice input through the voice input portion is shifted such that a sound with the same note or notes as one or two or more component tones that are among component tones of the chord determined by the chord determination portion and that are not a tone of a note close to the pitch of the voice input through the voice input portion is generated.

15. The harmony generation method according to claim 13, further comprising estimating the key of the piece of music being played on the basis of the chord determined by the chord determination portion,
wherein the key estimated by the key estimation portion is stored in the key storage portion.

16. The harmony generation method according to claim 13, wherein a chord as a chord being played is determined by the chord determination portion, in which the chord include a tone of a note close to the pitch of the voice input through the voice input portion, and all component tones of the chord that are among component tones of a scale based on the key stored in the key storage portion.

17. The harmony generation method according to claim 13, wherein when a tone of a note close to the pitch of the voice input through the voice input portion is not included in the component tones of the scale based on the key stored in the key storage portion, the pitch of the voice input through the voice input portion is shifted such that a sound with the same note or notes as one or two or more component tones that are among component tones of the chord determined by the chord determination portion and that are not the tone of the note close to the pitch of the voice input through the voice input portion is generated.

18. The harmony generation method according to claim 17, wherein the pitch of the voice input through the voice input portion is shifted by the pitch shift portion such that a sound with the same note or notes as one or two or more component tones that are among component tones of the chord determined by the chord determination portion and that are not a tone of a note close to the pitch of the voice input through the voice input portion is generated.

19. The harmony generation method according to claim 17, further comprising estimating the key of the piece of music being played on the basis of the chord determined by the chord determination portion,
wherein the key estimated by the key estimation portion is stored in the key storage portion.

20. The harmony generation method according to claim 17, wherein a chord as a chord being played is determined by the chord determination portion, in which the chord include a tone of a note close to the pitch of the voice input through the voice input portion, and all component tones of the chord that are among component tones of a scale based on the key stored in the key storage portion.

* * * * *